(12) United States Patent
Lin et al.

(10) Patent No.: US 11,848,782 B2
(45) Date of Patent: Dec. 19, 2023

(54) METHOD AND DEVICE FOR TRANSMITTING FEEDBACK INFORMATION

(71) Applicant: GUANGDONG OPPO MOBILE TELECOMMUNICATIONS CORP., LTD., Guangdong (CN)

(72) Inventors: Yanan Lin, Guangdong (CN); Jia Shen, Guangdong (CN)

(73) Assignee: GUANGDONG OPPO MOBILE TELECOMMUNICATIONS CORP., LTD.

( * ) Notice: Subject to any disclaimer, the term of this patent is extended or adjusted under 35 U.S.C. 154(b) by 262 days.

(21) Appl. No.: 16/950,866

(22) Filed: Nov. 17, 2020

(65) Prior Publication Data

US 2021/0067273 A1    Mar. 4, 2021

Related U.S. Application Data

(63) Continuation of application No. PCT/CN2019/083117, filed on Apr. 17, 2019.

(30) Foreign Application Priority Data

Jun. 28, 2018 (CN) .......................... 201810689008.1

(51) Int. Cl.
*H04L 1/1812* (2023.01)
*H04W 72/20* (2023.01)

(52) U.S. Cl.
CPC ........... *H04L 1/1812* (2013.01); *H04W 72/20* (2023.01)

(58) Field of Classification Search
CPC ... H04L 1/1812; H04L 1/1864; H04L 1/1861; H04L 1/1825; H04L 1/1854; H04W 72/1278; H04W 72/20
See application file for complete search history.

(56) References Cited

U.S. PATENT DOCUMENTS 9,253,770 B2 * 2/2016 Yang ................. H04W 72/0453
10,244,522 B2 * 3/2019 Li ............................. H04L 1/00
(Continued)

FOREIGN PATENT DOCUMENTS

CN    107733558 A    2/2018
JP    2017092615 A    5/2017
(Continued)

OTHER PUBLICATIONS

Huawei, et al. ""DCI Design for URLLC"" 3GPP TSG RAN WG1 Meeting #93, RI-1805902, Busan, Korea, May 21-May 25, 2018, May 12, 2018 (May 12, 2018) (3 pages).

(Continued)

*Primary Examiner* — Hanh N Nguyen
(74) *Attorney, Agent, or Firm* — Perkins Coie LLP

(57) ABSTRACT

A method for transmitting feedback information, a terminal device, and a network device are provided, which can meet feedback requirements of different downlink data without causing waste of resources. The method comprises: receiving, by a terminal device, downlink control information for scheduling target data sent by a network device; receiving by the terminal device, the target data sent by the network device; determining, by the terminal device, a feedback parameter of a hybrid automatic repeat request-acknowledgement (HARQ-ACK) codebook according to the downlink control information, wherein the HARQ-ACK codebook comprises HARQ-ACK information of the target data, the feedback parameter comprises a feedback mode of the HARQ-ACK codebook and/or a feedback resource for sending the HARQ-ACK codebook, and the feedback mode of the HARQ-ACK codebook comprises a semi-static feedback mode or a dynamic feedback mode; and sending, by the terminal device, the HARQ-ACK codebook to the network device according to the feedback parameter.

19 Claims, 5 Drawing Sheets

(56) References Cited

U.S. PATENT DOCUMENTS

| | | | |
|---|---|---|---|
| 2017/0134140 A1 | 5/2017 | Park | |
| 2018/0102892 A1 | 4/2018 | Lunttila et al. | |
| 2018/0176939 A1 | 6/2018 | Guan et al. | |
| 2019/0181988 A1* | 6/2019 | Gao | H04L 1/1858 |
| 2019/0230685 A1* | 7/2019 | Park | H04W 72/12 |
| 2020/0052831 A1* | 2/2020 | Yang | H04L 1/1614 |
| 2020/0059327 A1* | 2/2020 | Kini | H04L 1/1812 |
| 2022/0014317 A1* | 1/2022 | Wu | H04W 72/1273 |
| 2022/0231796 A1* | 7/2022 | Xu | H04L 1/1861 |

FOREIGN PATENT DOCUMENTS

| | | |
|---|---|---|
| WO | 2017024539 A1 | 2/2017 |
| WO | 2017161541 A1 | 9/2017 |

OTHER PUBLICATIONS

International Search Report dated Jul. 5, 2019 of PCT/CN2019/083117 (2 pages).
Qualcomm Incorporated. ""Summary of Maintenance for DL/UL Scheduling"" 3GPP TSG-RAN WG1 Meeting #93, RI-1807681, Busan, Korea, May 21-May 25, 2018, May 10, 2018 (May 10, 2018) (32 pages).
Ericsson "Corrections on CW mapping and data scrambling" R1-1802736; 3GPP TSG RAN WG1 Meeting #92; Athens, Greece; Feb. 2018. 5 pages.
Huawei et al. "Remaining issues on NR CA" R1-1805895; 3GPP TSG RAN WG1 Meeting #93; Busan, Korea; May 21-25, 2018. 10 pages.
Notice of Reasons for Refusal for Japanese Application No. 2020-569081 dated Jan. 28, 2021. 8 pages with English translation.
NTT Docomo, Inc. "Remaining issues CA and type1 HARQ-ACK codebook" R1-1807071; 3GPP TSG RAN WG1 Meeting #93; Busan, Korea; May 21-25, 2018. 11 pages.
OPPO "Discussion on HARQ-ACK transmission" R1-1718034; 3GPP TSG RAN WG1 Meeting #90bis; Prague, CZ; Oct. 9-13, 2017. 5 pages.
OPPO "Discussion on HARQ-ACK transmission" R1-1719993; 3GPP TSG RAN WG1 Meeting #91; Reno, NV, USA; Nov. 27-Dec. 1, 2017. 7 pages.
Samsung "Corrections on CA operation" R1-1804381; 3GPP TSG RAN WG1 Meeting #92bis; Sanya, China; Apr. 16-20, 2018. 6 pages.
First Office Action of the Chinese application No. 202110152857.5, dated Jul. 28, 2022. 41 pages with English Translation.
Samsung "HARQ-ACK Feedback for CA with Different Numerologies" R1-1700956; 3GPP TSG RAN WG1 Ad-Hoc Meeting #100; Spokane, USA, Jan. 16-20, 2017. 3 pages.
Samsung "HARQ-ACK Feedback for Numerology Multiplexing" R1-1705402; 3GPP TSG RAN WG1 #88 bis; Spokane, USA, Apr. 3-7, 2017. 4 pages.

* cited by examiner

METHOD AND DEVICE FOR TRANSMITTING FEEDBACK INFORMATION

CROSS-REFERENCE TO RELATED APPLICATIONS

The present application is a continuation application of International PCT Application No. PCT/CN2019/083117 filed on Apr. 17, 2019, which claims priority to Chinese Patent Application No. 201810689008.1, filed to the CNIPA on Jun. 28, 2018 and entitled "Method for Transmitting Feedback information, Terminal Device and Network Device". The above-identified applications are incorporated herein by reference in their entirety.

TECHNICAL FIELD

Embodiment of the present application relates to the field of communication, and more particularly, to a method and device for transmitting feedback information and a computer-readable storage medium.

BACKGROUND

The concept of hybrid automatic repeat request-acknowledgement (HARQ-ACK) codebook, which is used for feeding back HARQ-ACK information of multiple downlink data, is introduced in a new radio (NR) system (or 5G system or 5G network).

In the related art, there are two ways for determining the HARQ-ACK codebook: a semi-static feedback mode (Type1) and a dynamic feedback mode (Type2). For the semi-static feedback mode, the size of the HARQ-ACK codebook and a corresponding relationship between each indication field in the HARQ-ACK codebook and a physical downlink shared channel (PDSCH) are determined semi-statically. For the dynamic feedback mode, the size of the HARQ-ACK codebook and the corresponding relationship between each indication field in the HARQ-ACK codebook and the PDSCH are determined dynamically, depending specifically on an indication of a downlink assignment index (DAI). Requirements of downlink data of different service types for reliability and latency etc. are different.

SUMMARY

Embodiments of the present application provide a method for transmitting feedback information and a computer-readable storage medium.

In a first aspect, there is provided a method for transmitting feedback information, which includes: a terminal device receives downlink control information for scheduling target data sent by a network device; the terminal device receives the target data sent by the network device; the terminal device determines a feedback parameter of a hybrid automatic repeat request-acknowledgement (HARQ-ACK) codebook according to the downlink control information, wherein the HARQ-ACK codebook includes HARQ-ACK information of the target data, the feedback parameter includes a feedback mode of the HARQ-ACK codebook and/or a feedback resource for sending the HARQ-ACK codebook, and the feedback mode of the HARQ-ACK codebook includes a semi-static feedback mode or a dynamic feedback mode; and the terminal device sends the HARQ-ACK codebook to the network device according to the feedback parameter.

In a second aspect, there is provided a method for transmitting feedback information, which includes: a network device sends downlink control information for scheduling target data to a terminal device, the downlink control information being used for the terminal device to determine a feedback parameter of a hybrid automatic repeat request-acknowledgement (HARQ-ACK) codebook, wherein the HARQ-ACK codebook includes HARQ-ACK information of the target data, the feedback parameter includes a feedback mode of the HARQ-ACK codebook and/or a feedback resource for sending the HARQ-ACK codebook, and the feedback mode of the HARQ-ACK codebook includes a semi-static feedback mode or a dynamic feedback mode; the network device sends the target data to the terminal device; and the network device receives the HARQ-ACK codebook sent by the terminal device according to the feedback parameter.

In a third aspect, there is provide a computer-readable storage medium used to store a computer program. The computer program causes a computer to perform the following method: a terminal device receives downlink control information for scheduling target data sent by a network device; the terminal device receives the target data sent by the network device; the terminal device determines a feedback parameter of a hybrid automatic repeat request-acknowledgement (HARQ-ACK) codebook according to the downlink control information, wherein the HARQ-ACK codebook includes HARQ-ACK information of the target data, the feedback parameter includes a feedback mode of the HARQ-ACK codebook and/or a feedback resource for sending the HARQ-ACK codebook, and the feedback mode of the HARQ-ACK codebook includes a semi-static feedback mode or a dynamic feedback mode; and the terminal device sends the HARQ-ACK codebook to the network device according to the feedback parameter. Or, the computer program causes the computer to perform the following method: a network device sends downlink control information for scheduling target data to a terminal device, the downlink control information being used for the terminal device to determine a feedback parameter of a hybrid automatic repeat request-acknowledgement (HARQ-ACK) codebook, wherein the HARQ-ACK codebook includes HARQ-ACK information of the target data, the feedback parameter includes a feedback mode of the HARQ-ACK codebook and/or a feedback resource for sending the HARQ-ACK codebook, and the feedback mode of the HARQ-ACK codebook includes a semi-static feedback mode or a dynamic feedback mode; the network device sends the target data to the terminal device; and the network device receives the HARQ-ACK codebook sent by the terminal device according to the feedback parameter.

DETAILED DESCRIPTION

Technical schemes in embodiments of the present application will be described below with reference to the drawings in the embodiments of the present application. It is apparent that the embodiments described are just some of the embodiments of the present application, but not all of the embodiments of the present application. Based on the embodiments of the present application, all other embodiments achieved by a person of ordinary skill in the art without making inventive efforts are within the protection scope of the present application.

The technical schemes in the embodiments of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, a LTE Time Division Duplex (TDD) system, an advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunications System (UMTS), a Worldwide Interoperability for Microwave Access (WiMAX) communication system, a Wireless Local Area Network (WLAN), Wireless Fidelity (WiFi), a next generation communication system or other communication systems, etc.

Generally speaking, a limited number of connections are supported by traditional communication systems and are easy to implement. However, with the development of communication technology, a mobile communication system will not only support traditional communication, but also support, for example, device to device (D2D) communication, machine to machine (M2M) communication, machine type communication (MTC), vehicle to vehicle (V2V) communication, etc., to which the embodiments of the present application may also be applied.

Optionally, the communication systems in the embodiments of the present application can be applied to a carrier aggregation (CA) scenario, or a dual connectivity (DC) scenario, or a standalone (SA) networking scenario.

Figure 1:
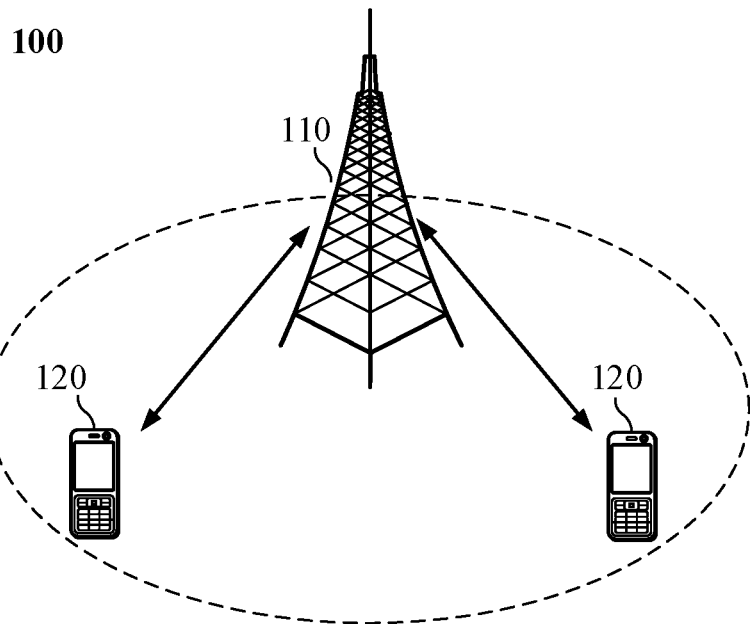
FIG. 1 is a schematic diagram of a possible wireless communication system to which an embodiment of the present application is applied.

Illustratively, a communication system 100 applied in an embodiment of the present application is shown in FIG. 1. The wireless communication system 100 may include a network device 110. The network device 110 may be a device that communicates with a terminal device. The network device 110 may provide communication coverage for a specific geographical area, and may communicate with terminal devices located within the coverage area. Optionally, the network device 110 may be a base transceiver station (BTS) in a GSM system or CDMA system, or a NodeB (NB) in a WCDMA system, or an Evolutional Node B (eNB or eNodeB) in an LTE system, or a network side device in an NR system, or a radio controller in a Cloud Radio Access Network (CRAN), or the network device may be a relay station, an access point, a vehicle-mounted device, a wearable device, a network side device in a next generation network, or a network device in a future evolved Public Land Mobile Network (PLMN), etc.

The wireless communication system 100 further includes at least one terminal device 120 located in the coverage area of the network device 110. The "terminal device" as used herein includes, but not limited to, a device configured to receive/send communication signals via a wired line connection, for example, via a Public Switched Telephone Network (PSTN), a digital subscriber line (DSL), a digital cable, a direct cable; and/or another data connection/network; and/or via a wireless interface, e.g., for a cellular network, a wireless local area network (WLAN), a digital television network such as a DVB-H network, a satellite network, or an AM-FM broadcast transmitter; and/or another terminal device; and/or an Internet of Things (IoT) device. A terminal device configured to communicate via a wireless interface may be referred to as a "wireless communication terminal", a "wireless terminal" or a "mobile terminal".

The terminal device 120 may be mobile or fixed. Optionally, the terminal device 120 may refer to an access terminal, user equipment (UE), a subscriber unit, a subscriber station, a mobile station, a rover, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device, or other processing device connected to a wireless modem, a vehicle-mounted device, a wearable device, a terminal device in a future 5G network, or a terminal device in a future evolved Public Land Mobile Network (PLMN), or the like. Optionally, device to device (D2D) communication may be carried out between the terminal devices 120.

Specifically, the network device 110 can provide services for a cell, and the terminal device 120 communicates with the network device 110 through transmission resources (e.g., frequency domain resources or spectrum resources) used in the cell. The cell can be a cell corresponding to the network device 110 (e.g., a base station), and the cell may belong to a macro base station, or belong to a base station corresponding to a small cell. The small cell herein, which can include a metro cell, a microcell, a picocell, a femtocell, etc., have characteristics such as small coverage area and low transmitting power, and is suitable for providing high-speed data transmission services.

FIG. 1 illustrates exemplarily one network device and two terminal devices. Optionally, the wireless communication system 100 may include multiple network devices, and another quantity of terminal devices may be included within the coverage area of each network device, which is not limited in the embodiments of the present application.

Optionally, the wireless communication system 100 may also include other network entities, such as a network controller and a mobile management entity, which is not limited in the embodiments of the present application.

It should be noted that a terminal device can simultaneously feed back HARQ-ACK information of multiple downlink data to the network device through a HARQ-ACK codebook. For a semi-static feedback mode, the size of the HARQ-ACK codebook and a corresponding relationship between each indication field in the HARQ-ACK codebook and the downlink data (or downlink transmission or PDSCH) are determined semi-statically. For a dynamic feedback mode, the size of the HARQ-ACK codebook and the corresponding relationship between each indication field in the HARQ-ACK codebook and the downlink data (or downlink transmission or PDSCH) are determined dynamically, depending specifically on an indication of a DAI. When the semi-static feedback mode is used, there will be no problem of inconsistent understanding of the network device and the terminal device because there is no dependence on the indication of the DAI. However, because the size of the HARQ-ACK codebook is fixed, there is a problem of waste of feedback resources in the case that the transmission amount of the downlink data is small. For the dynamic feedback mode, the size of the HARQ-ACK codebook varies to adapt to the data transmission situation. However, if the terminal device fails to detect a downlink control channel successfully, there may be a problem of inconsistent understanding of the network device and the terminal device.

In addition, if the terminal device feeds back the HARQ-ACK information of multiple downlink data simultaneously through the HARQ-ACK codebook, and requirements of the downlink data for reliability and latency etc. of the HARQ-ACK information are different, then the HARQ-ACK codebook cannot meet the feedback requirement of each of the downlink data at the same time.

Figure 2:
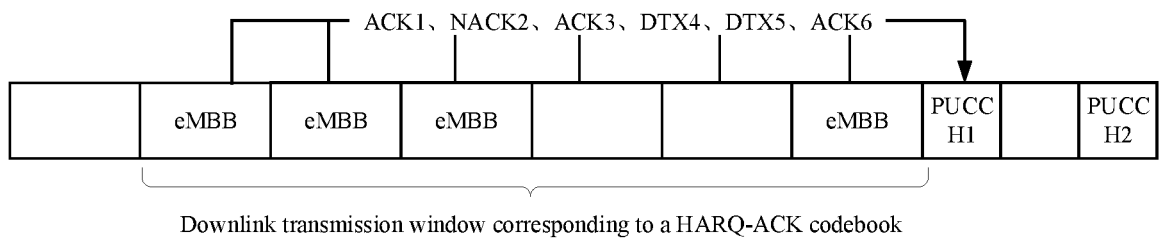
FIG. 2 is a schematic diagram of a dynamic feedback mode of a HARQ-ACK codebook.

For example, a schematic diagram of transmission of a HARQ-ACK codebook in a semi-static feedback mode is shown in FIG. 2. Six downlink transmission resources are included in a downlink transmission window corresponding to the HARQ-ACK codebook, wherein there are downlink data on the 1st transmission resource, the 2nd transmission resource, the 3rd transmission resource and the 6th transmission resource, and HARQ-ACK information of the downlink data on these four transmission resources is sequentially Acknowledgement (ACK)1, Negative Acknowledgement (NACK)1, NACK2, ACK3 and ACK6, while there is no downlink data on the 4th transmission resource and the 5th transmission resource in the downlink transmission window, which are denoted as Discontinuous Transmission (DTX)4 and DTX5 respectively. A terminal device may send the HARQ-ACK codebook on a physical uplink control channel (PUCCH)1, and the HARQ-ACK codebook includes six indication fields, which sequentially correspond to the HARQ-ACK information of the downlink data on the above six transmission resources. Assuming that 1 is used to represent ACK and 0 is used to represent NACK, the HARQ-ACK codebook is 101xx1, where "x" represents a placeholder, indicating that there is no downlink data on the 4th and 5th transmission resources and thus no HARQ-ACK information is fed back.

It should be noted that the size of the HARQ-ACK codebook in the semi-static feedback mode is fixed. If a current data amount is small, for example, there is downlink data only on the 3rd transmission resource in the downlink transmission window corresponding to the HARQ-ACK codebook, but there is no downlink data on other transmission resources, then the 6-bit HARQ-ACK codebook will still be fed back, thus increasing unnecessary bit overhead.

Figure 3:
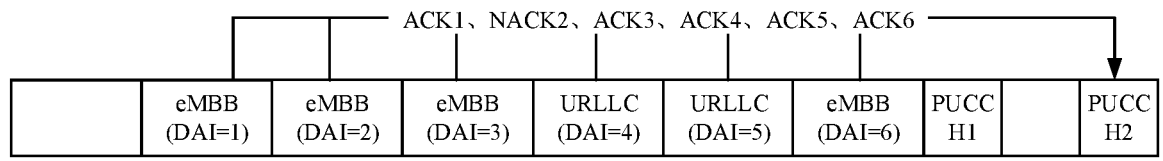
FIG. 3 is a schematic diagram of a semi-static feedback mode of a HARQ-ACK codebook.

As another example, a schematic diagram of transmission of a HARQ-ACK codebook in a dynamic feedback mode is shown in FIG. 3. The HARQ-ACK codebook includes HARQ-ACK information of downlink data of two service types. The latency requirement of data of enhance mobile broadband (eMBB) type is lower, while the latency requirement of data of ultra-reliable & low latency (URLLC) type is higher and the reliability requirement is higher. A DAI corresponding to each of the downlink data is carried in download control information (DCI), and the DAI can be used to indicate the order of the HARQ-ACK information of the six downlink data in the HARQ-ACK codebook. For example, DAI=1 indicates that the HARQ-ACK information of the data is the first piece of HARQ-ACK information of the HARQ-ACK information fed back on the same PUCCH, and DAI=2 indicates that the HARQ-ACK information of the data is the second piece of HARQ-ACK information of the HARQ-ACK information fed back on the same PUCCH. The HARQ-ACK information of downlink data with DAI=1 is represented by the first indication field in the HARQ-ACK codebook sent on the PUCCH, and the HARQ-ACK information of downlink data with DAI=2 is represented by the second indication field in the HARQ-ACK codebook sent on the PUCCH, and so forth. If the HARQ-ACK codebook is transmitted on PUCCH2, it may result in that the latency requirement of the data of URLLC type cannot be met. In addition, because the feedback of the HARQ-ACK information of data of the URLLC type needs higher reliability, a lower bit rate needs to be set when the HARQ-ACK codebook is transmitted on PUCCH2, which is a waste for the data of eMBB type, and if the bit rate on PUCCH2 is set higher, the reliability requirement of the data of URLLC type cannot be met.

Therefore, it is proposed in an embodiment of the present application that a network device may flexibly indicate to a terminal device, through downlink control information, a feedback parameter to be used for feeding back a HARQ-ACK codebook, and after receiving the downlink control information, the terminal device may obtain, according to the downlink control information, the feedback parameter to be used when sending the HARQ-ACK codebook, thus meeting the feedback requirement of different downlink data without causing resource waste.

Figure 4:
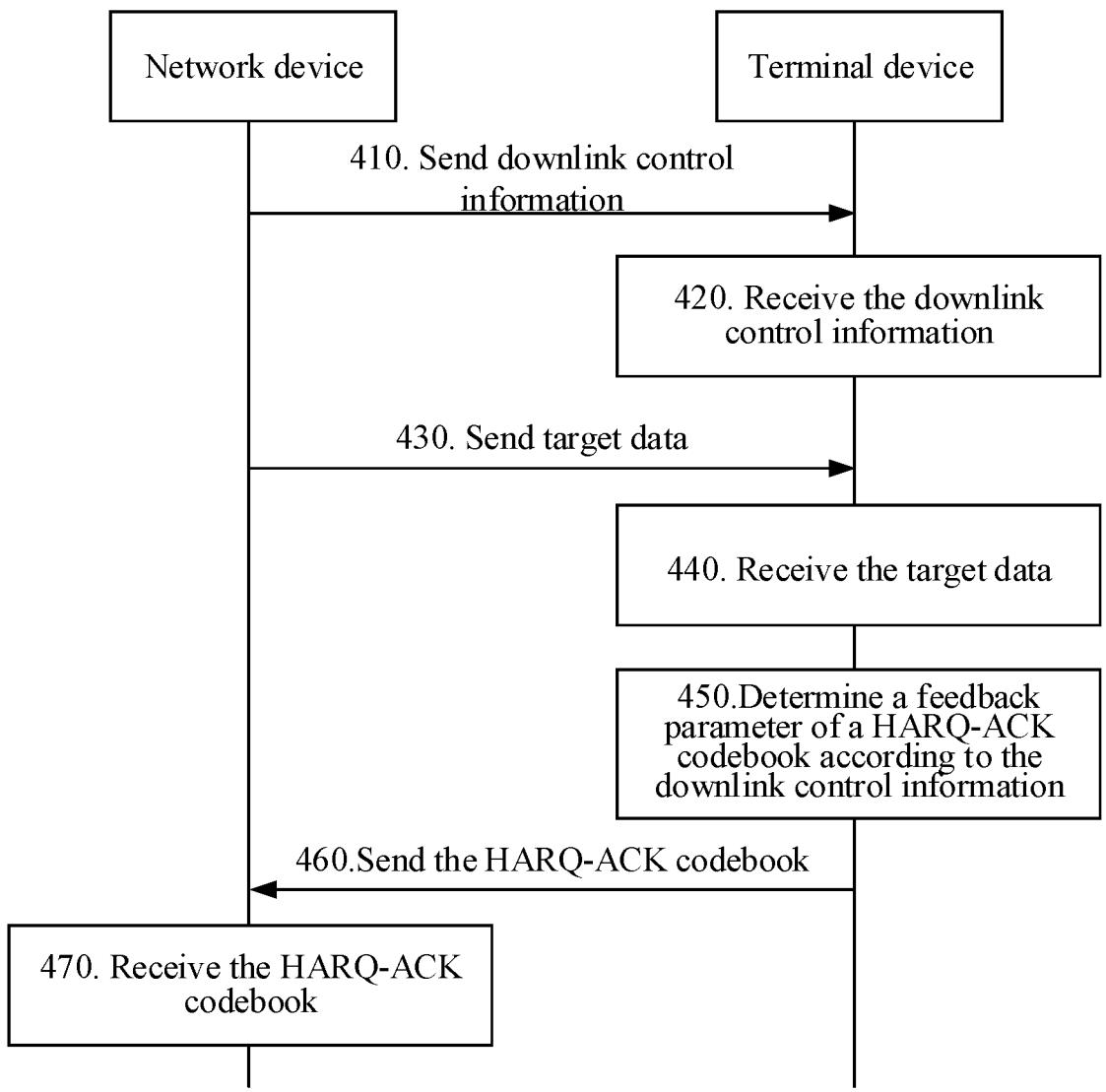
FIG. 4 is a schematic diagram of an interaction flow of a method for transmitting information according to an embodiment of the present application.

FIG. 4 is a schematic flow chart of a method for transmitting feedback information according to an embodiment of the present application. The method described in FIG. 4 can be performed by a terminal device such as the terminal device 120 shown in FIG. 1 and a network device such as the network device 110 shown in FIG. 1. As shown in FIG. 4, the method 400 for transmitting the feedback information may include part or all of the following steps.

In 410, the network device sends downlink control information for scheduling target data to the terminal device.

The downlink control information is used for the terminal device to determine a feedback parameter of a hybrid automatic repeat request-acknowledgement (HARQ-ACK) codebook.

The HARQ-ACK codebook includes HARQ-ACK information of the target data, the feedback parameter includes a feedback mode of the HARQ-ACK codebook and/or a feedback resource for sending the HARQ-ACK codebook, and the feedback mode of the HARQ-ACK codebook includes a semi-static feedback mode or a dynamic feedback mode.

In 420, the terminal device receives the downlink control information sent by the network device.

In 430, the network device sends the target data to the terminal device.

In 440, the terminal device receives the target data sent by the network device.

In 450, the terminal device determines the feedback parameter of the HARQ-ACK codebook according to the downlink control information.

In 460, the terminal device sends the HARQ-ACK codebook to the network device according to the feedback parameter.

In 470, the network device receives the HARQ-ACK codebook sent by the terminal device according to the feedback parameter.

Specifically, after the network device sends the target data to the terminal device, the terminal device needs to feed back the HARQ-ACK information of the target data to the network device. The terminal device can use a certain feedback mode to feed back the HARQ-ACK information of the target data to the network device through the HARQ-ACK codebook on the feedback resource. The HARQ-ACK codebook may include at least one indication field, which is used to respectively indicate the HARQ-ACK information of at least one piece of downlink data including the target data, so that the HARQ-ACK information of at least one piece of downlink data can be fed back at the same time. The terminal device may determine the feedback parameter for sending the HARQ-ACK codebook according to the downlink control information for scheduling the target data, and the feedback parameter may include the feedback mode of the HARQ-ACK codebook and/or the feedback resource of the HARQ-ACK codebook. After configuring the feedback mode and/or the feedback resource of the HARQ-ACK codebook for the terminal device, the network device may indicate the feedback mode and/or the feedback resource to the terminal device through downlink control information, so that the terminal device can know, according to the detected downlink control information, in which feedback mode and/or on which feedback resource the HARQ-ACK codebook is sent to the network device.

Optionally, if the terminal device determines that the feedback mode of the HARQ-ACK codebook is a semi-static feedback mode, the method further includes: the terminal device determines a position of the HARQ-ACK information of the target data in the HARQ-ACK codebook according to a position of the target data in a transmission window corresponding to the HARQ-ACK codebook.

Optionally, if the terminal device determines that the feedback mode of the HARQ-ACK codebook is a dynamic feedback mode, the method further includes: the terminal device determines the position of the HARQ-ACK information of the target data in the HARQ-ACK codebook according to a DAI of the target data carried in the downlink control information. In some embodiments, for the semi-static feedback mode, the HARQ-ACK codebook may correspond to one downlink transmission window and the HARQ-ACK codebook includes at least one indication field, and at least one transmission resource which is in one-to-one correspondence with the at least one indication field is included in the downlink transmission window. Each indication field in the HARQ-ACK codebook is used to indicate the HARQ-ACK information of the downlink data sent on a corresponding transmission resource.

For the dynamic feedback mode, at least one indication field in the HARQ-ACK codebook is used to respectively indicate feedback information of at least one downlink data, wherein a DAI of each downlink data is carried in the downlink control information corresponding to the downlink data, and the DAI is used to indicate a position of the HARQ-ACK information of the downlink data in the HARQ-ACK codebook. For example, DAI=1 indicates that the HARQ-ACK information of the data is indicated in the first indication field in the HARQ-ACK codebook, and DAI=2 indicates that the HARQ-ACK information of the data is indicated in the second indication field in the HARQ-ACK codebook.

It should be understood that the sizes of the serial numbers shown in FIG. 4 do not mean the order of execution. For example, 420 can be executed before 440, that is, the target data is detected after completion of the detection of the downlink control information; or 420 and 440 can be executed simultaneously, for example, the terminal device can start to detect the target data during the detection of the downlink control information, and does not necessarily detect the target data after completion of the detection of the downlink control information.

The network device can directly indicate the feedback parameter to the terminal device through the downlink control information explicitly, for example, the feedback parameter is carried in the downlink control information. Alternatively, the network device may implicitly indicate the feedback parameter to the terminal device through the downlink control information, which will be described in detail below.

In some embodiments, the feedback parameter may include a feedback mode of the HARQ-ACK codebook, a feedback resource of the HARQ-ACK codebook, or both the feedback mode and the feedback resource, which will be described in detail below.

Case 1

The feedback parameter includes the feedback mode of the HARQ-ACK codebook.

Optionally, the method further includes: the network device determines a radio network temporary identity (RNTI) for scrambling the downlink control information according to the feedback parameter of the HARQ-ACK codebook.

For example, if the feedback mode of the HARQ-ACK codebook is the semi-static feedback mode, the network device determines that the RNTI for scrambling the downlink control information is a first RNTI; and/or if the feedback mode of the HARQ-ACK codebook is the dynamic feedback mode, the network device determines that the RNTI for scrambling the downlink control information is a second RNTI.

Accordingly, in 450, if the RNTI for descrambling the downlink control information is the first RNTI, the terminal device determines that the feedback mode of the HARQ-ACK codebook is the semi-static feedback mode; and/or if the RNTI for descrambling the downlink control information is the second RNTI, the terminal device determines that the feedback mode of the HARQ-ACK codebook is the dynamic feedback mode.

In addition, optionally, in 470, the network device may receive the HARQ-ACK codebook sent by the terminal device according to the semi-static feedback mode, and the HARQ-ACK codebook includes the HARQ-ACK information of the downlink data scheduled by the downlink control information scrambled with the first RNTI; and/or the network device may receive the HARQ-ACK codebook sent by the terminal device according to the dynamic feedback mode, and the HARQ-ACK codebook includes the HARQ-ACK information of the downlink data scheduled by the downlink control information scrambled with the second RNTI.

That is to say, if a different feedback mode of the HARQ-ACK codebook is selected by the network device for the terminal device, a different RNTI is used by the network device when scrambling a cyclic redundancy check (CRC) of the downlink control information. If the feedback mode of the HARQ-ACK codebook is the semi-static feedback mode, the network device will scramble the CRC of the downlink control information with the first RNTI, and the terminal device, after receiving the downlink control information for scheduling the target data, will find that the RNTI for descrambling the downlink control information is the first RNTI, and then send the HARQ-ACK codebook to the network device by the semi-static feedback mode. If the feedback mode of the HARQ-ACK codebook is the dynamic feedback mode, the network device will scramble the CRC of the downlink control information with the second RNTI, and the terminal device, after receiving the downlink control information for scheduling the target data, will find that the RNTI for descrambling the downlink control information is the second RNTI, and then send the HARQ-ACK codebook to the network device by the dynamic feedback mode.

The network device, for example, may send first configuration information, which indicates a corresponding relationship between the RNTI for scrambling the downlink control information and the feedback mode of the HARQ-ACK codebook, to the terminal device, and the terminal device may obtain the corresponding relationship from the first configuration information sent by the network device after receiving it.

Of course, the corresponding relationship may be agreed in a protocol, and the terminal device can acquire the corresponding relationship pre-stored in the terminal device.

The first configuration information may be, for example, high layer signaling. The corresponding relationship between the RNTI for scrambling the downlink control information and the feedback mode of the HARQ-ACK codebook may be, for example, as shown in Table 1.

TABLE 1

| RNTI | Feedback mode |
| --- | --- |
| First RNTI | Semi-static feedback mode |
| Second RNTI | Dynamic feedback mode |

Optionally, before the network device determines the downlink control information according to the feedback mode of the HARQ-ACK codebook, the method further includes: the network device determines the feedback mode of the HARQ-ACK codebook according to the size of the amount of the downlink data.

For example, if the amount of the downlink data corresponding to the HARQ-ACK codebook is greater than or equal to a preset threshold, the network device determines that the feedback mode of the HARQ-ACK codebook is the semi-static feedback mode; and/or if the amount of the downlink data corresponding to the HARQ-ACK codebook is less than the preset threshold, the network device determines that the feedback mode of the HARQ-ACK codebook is the dynamic feedback mode.

Or in other words, if the amount of the downlink data is greater than or equal to the preset threshold, the network device determines that the RNTI for scrambling the downlink control information is the first RNTI; and/or if the amount of the downlink data is less than the preset threshold, the network device determines that the RNTI for scrambling the downlink control information is the second RNTI.

Figure 5:
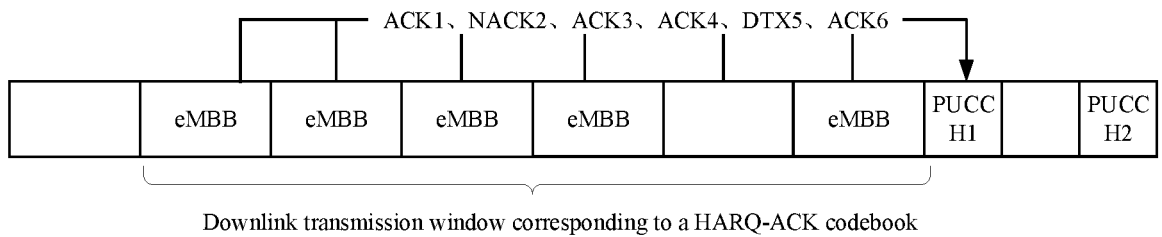
FIG. 5 is a schematic diagram of transmission of a HARQ-ACK codebook by a semi-static feedback mode according to an embodiment of the present application.

For example, a schematic diagram of transmission of a HARQ-ACK codebook by the semi-static feedback mode is shown in FIG. 5. The amount of downlink data corresponding to the HARQ-ACK codebook is large, and six downlink transmission resources are included in a downlink transmission window corresponding to the HARQ-ACK codebook, wherein there are downlink data on the 1st transmission resource, the 2nd transmission resource, the 3rd transmission resource, the 4th transmission resource and the 6th transmission resource, and HARQ-ACK information of the downlink data on these five transmission resources are sequentially ACK1, NACK2, ACK3, ACK4 and ACK6, while there is no downlink data on the 5th transmission resource in the downlink transmission window, which is denoted as DTXS. A terminal device may send the HARQ-ACK codebook on PUCCH1, where the HARQ-ACK codebook includes six indication fields, which are used to indicate sequentially the HARQ-ACK information of the downlink data on the above six transmission resources. Assuming that 1 is used to represent ACK and 0 is used to represent NACK, the HARQ-ACK codebook can be 1011 ×1, where "×" represents a placeholder, indicating that there is no downlink data on the 5th transmission resource and thus no HARQ-ACK information is fed back.

Figure 6:
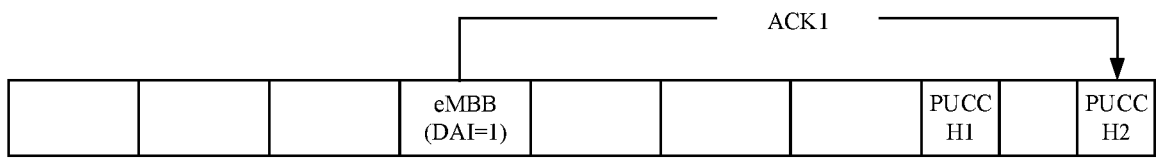
FIG. 6 is a schematic diagram of transmission of a HARQ-ACK codebook by a dynamic feedback mode according to an embodiment of the present application.

It should be noted that if the amount of the downlink data corresponding to the HARQ-ACK codebook is small, and there is downlink data only on the 3rd transmission resource in the downlink transmission window corresponding to the HARQ-ACK codebook, while there is no downlink data on other transmission resources, at this time, if the semi-static feedback mode is used, the 6-bit HARQ-ACK codebook should also be fed back, thus increasing unnecessary bit overhead. Therefore, a schematic diagram of transmission of a HARQ-ACK codebook by the dynamic feedback mode is shown in FIG. 6. At this time, the terminal device can send a 1-bit HARQ-ACK codebook to the network device by the dynamic feedback mode, thereby reducing bit overhead.

It can be seen from FIG. 5 and FIG. 6 that the network device can select the feedback mode to be used to send the HARQ-ACK codebook for the terminal device based on the amount of the downlink data that needs feedback of HARQ-ACK information. If the data amount is large, the first RNTI is used to scramble the downlink control information, so that the terminal device can know that the HARQ-ACK codebook is sent by the semi-static feedback mode after descrambling the downlink control information; if the data amount is small, the second RNTI is used to scramble the downlink control information, so that the terminal device can know that the dynamic feedback mode needs to be used to send the HARQ-ACK codebook after descrambling the downlink control information.

Case 2

The feedback parameter includes a feedback resource of the HARQ-ACK codebook.

Optionally, the method further includes: the network device determines an uplink control channel for the terminal device to send the HARQ-ACK codebook according to a service type of the target data; and the network device sending second configuration information, which indicates the uplink control channel for sending the HARQ-ACK codebook, to the terminal device. The second configuration information is carried in the last downlink control information among downlink control information scrambled with the same RNTI as the downlink control information.

Optionally, in situation 2, the RNTIs used by the network device when scrambling the downlink control information for scheduling downlink data of different service types are different. For example, for the downlink control information for scheduling downlink data of the URLLC type, the RNTI used in scrambling may be a first RNTI; for the downlink control information for scheduling downlink data of the eMBB type, the RNTI used in scrambling the downlink control information may be a second RNTI. As another example, for the downlink control information for scheduling the downlink data of the eMBB type, the RNTI used in scrambling may be the first RNTI; for the downlink control information for scheduling the downlink data of the URLLC type, the RNTI used in scrambling the downlink control information may be the second RNTI.

Accordingly, in 450, the terminal device may determine the uplink control channel for sending the HARQ-ACK codebook according to the second configuration information carried in the last downlink control information among the downlink control information descrambled with the same RNTI as the downlink control information. In 460, the terminal device sends the HARQ-ACK codebook to the network device on the uplink control channel.

In addition, optionally, in 470, the network device may receive the HARQ-ACK codebook sent by the terminal device on the uplink control channel, wherein HARQ-ACK codebooks received by the network device on different uplink control channels include HARQ-ACK information of downlink data scheduled by downlink control information scrambled with different RNTIs. For example, the network device receives the HARQ-ACK information of the downlink data scheduled by downlink control information scrambled with the first RNTI on a first uplink control channel, and receives the HARQ-ACK information of the downlink data scheduled by downlink control information scrambled with the second RNTI on a second uplink control channel.

It should be understood that in multiple pieces of downlink control information scrambled with the same RNTI, the uplink control channel carried in the last downlink control information is the uplink control channel for sending the HARQ-ACK codebook. That is to say, which uplink control channel the terminal device sends the HARQ-ACK codebook on is not necessarily based on the uplink control channel carried in the downlink control information for scheduling the target data, but based on the uplink control channel carried in the last downlink control information among the downlink control information scrambled with the same RNTI. If the downlink control information for scheduling the target data is the last downlink control information among downlink control information scrambled with the same RNTI, then the uplink control channel indicated by the downlink control information for scheduling the target data is the uplink control channel for sending the HARQ-ACK codebook.

Figure 7:
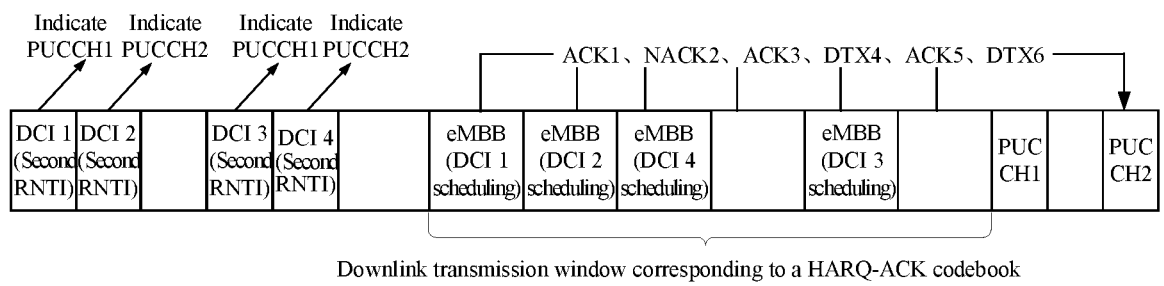
FIG. 7 is a schematic diagram of a PUCCH for transmitting a HARQ-ACK codebook according to an embodiment of the present application.

For example, as shown in FIG. 7, taking the static feedback mode as an example, the downlink control information for scheduling data of the eMBB type is scrambled with the second RNTI. The PUCCH indicated in DCI 1 and DCI 3 is PUCCH1, and the PUCCH indicated in DCI 2 and DCI 4 is PUCCH2. Because DCI 4 is the last DCI that is sent, and the PUCCH indicated in DCI 4 is PUCCH2, the HARQ-ACK information of the four downlink data of the eMBB type all should be fed back on PUCCH2. As shown in FIG. 7, the HARQ-ACK codebook sent on PUCCH2 is 101×1×, where "×" is a placeholder, indicating that there is no downlink data on the 4th and 6th transmission resources and thus no HARQ-ACK information is fed back.

Since requirements of downlink data of different service types for latency and reliability are different, the uplink control channels used to send these downlink data may also be different in this embodiment. These different service types may include, for example, eMBB, URLLC, mMTC, etc.

For example, if the service type of the target data is URLLC, the network device may determine that the uplink control channel used to send the HARQ-ACK codebook is a first uplink control channel; and/or if the service type of the target data is eMBB, the network device determines that the uplink control channel used to send the HARQ-ACK codebook is a second uplink control channel.

Optionally, the first uplink control channel is located before the second uplink control channel in time domain, and/or a coding bit rate of the first uplink control channel is lower than that of the second uplink control channel.

Figure 8:
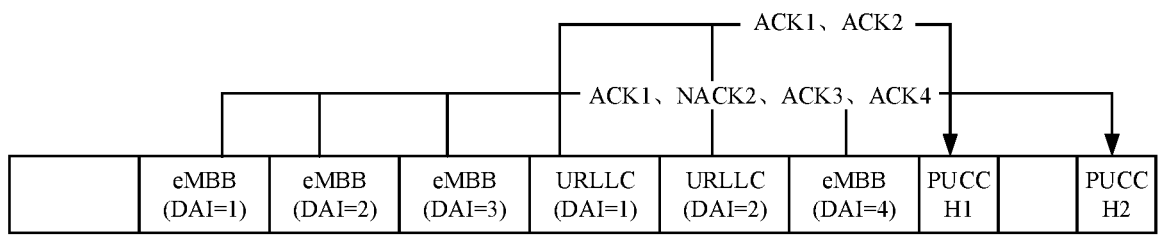
FIG. 8 is a schematic diagram of transmission of a HARQ-ACK codebook of data of different service types according to an embodiment of the present application.

For example, as shown in FIG. 8, taking the dynamic feedback mode as an example, the latency requirement of data of the eMBB type is low, and the HARQ-ACK codebook of this type of data can be sent on a later PUCCH2, while the latency requirement of data of the URLLC type is high, and the HARQ-ACK codebook of this type of data can be sent on an earlier PUCCH1. In addition, data of the URLLC type requires higher reliability, and a lower bit rate needs to be set when the HARQ-ACK codebook of the data of the URLLC type is sent on PUCCH1, while a higher bit rate can be set when the HARQ-ACK codebook of data of the eMBB type is sent on PUCCH2. Optionally, the downlink control information for scheduling downlink data of the URLLC type is scrambled with the first RNTI, and the downlink control information for scheduling downlink data of the eMBB type is scrambled with the second RNTI.

As shown in FIG. 8, assuming that the HARQ-ACK information of four downlink data of the eMBB type is ACK1, NACK2, ACK3 and ACK4 respectively, and the HARQ-ACK information of two data of the URLLC type is ACK1 and ACK2 respectively, then the HARQ-ACK codebook transmitted on PUCCH2 can be 1011, and the HARQ-ACK codebook transmitted on PUCCH1 can be 11.

Since the HARQ-ACK information of data of different service types can be fed back respectively, the feedback requirements of different downlink data can be met without causing resource waste when the HARQ-ACK information of the data of different types is fed back.

In the two cases, optionally, the HARQ-ACK information of downlink data scheduled by downlink control information scrambled and descrambled with different RNTIs is located in different HARQ-ACK codebooks. In other words, the HARQ-ACK information of the downlink data scheduled by the downlink control information scrambled and descrambled with different RNTIs is fed back on different uplink control channels.

For example, in case 2, the HARQ-ACK information of downlink data of the URLLC type scheduled by downlink control information scrambled with the first RNTI is transmitted on PUCCH1 through a HARQ-ACK codebook, and the HARQ-ACK information of downlink data of the eMBB type scheduled by downlink control information scrambled with the second RNTI is transmitted on PUCCH2 through a HARQ-ACK codebook.

It should be understood that in the embodiment of the present application, case 1 and case 2 can be implemented separately or simultaneously. For example, the network device can determine which RNTI is used to scramble the downlink control information for scheduling the target data according to the feedback mode of the HARQ-ACK codebook corresponding to the target data and the service type of the target data.

For example, the feedback mode includes a semi-static feedback mode or a dynamic feedback mode, and the service type includes eMBB or URLLC. The network device may consider the feedback mode of the HARQ-ACK codebook and the service type of the target data in combination, for example, considering the feedback mode preferentially and the service type secondly, or considering the service type preferentially and the feedback mode secondly, and in combination with the corresponding relationship among feedback modes, service types and RNTIs as shown in any one of tables 2 to 6, select an appropriate RNTI from the first RNTI and the second RNTI to scramble the downlink control information for scheduling the target data.

TABLE 2

| RNTI | Feedback mode | Service type |
| --- | --- | --- |
| First RNTI | Semi-static feedback mode | eMBB |
| Second RNTI | Dynamic feedback mode | URLLC |

TABLE 3

| RNTI | Feedback mode | Service type |
| --- | --- | --- |
| First RNTI | Semi-static feedback mode | URLLC |
| Second RNTI | Dynamic feedback mode | eMBB |

TABLE 4

| RNTI | Feedback mode | Service type |
| --- | --- | --- |
| First RNTI | Semi-static feedback mode | eMBB |
|  |  | URLLC |
| Second RNTI | Dynamic feedback mode | eMBB |
|  |  | URLLC |

TABLE 5

| RNTI | Service type | Feedback mode |
| --- | --- | --- |
| First RNTI | eMBB | Semi-static feedback mode |
|  |  | Dynamic feedback mode |
| Second RNTI | URLLC | Semi-static feedback mode |
|  |  | Dynamic feedback mode |

It should be noted that if the network device needs to implement case 1 and case 2 simultaneously, four RNTIs can be configured. For example, Table 6 shows a corresponding relationship among feedback modes, service types and RNTIs. The network device may consider the feedback mode of the HARQ-ACK codebook and the service type of the target data in combination according to the implementations described in case 1 and case 2, so as to select an appropriate RNTI from the first RNTI, the second RNTI, the third RNTI and the fourth RNTI to scramble the downlink control information for scheduling the target data.

TABLE 6

| RNTI | Feedback mode | Service type |
| --- | --- | --- |
| First RNTI | Semi-static feedback mode | URLLC |
| Second RNTI | Dynamic feedback mode | eMBB |
| Third RNTI | Semi-static feedback mode | eMBB |
| Fourth RNTI | Dynamic feedback mode | URLLC |

It should be noted that without a conflict, various embodiments described in the present application and/or technical features in various embodiments can be arbitrarily combined with each other, and the technical schemes obtained from the combination should also fall into the protection scope of the present application.

It should be understood that in various embodiments of the present application, the sizes of serial numbers in various processes described above does not imply an order of execution of various processes, which should be determined by their functions and internal logics, and should not constitute any limitation on implementation processes of the embodiments of the present application.

A communication method according to an embodiment of the present application has been described in detail above. Devices according to embodiments of the present application will be described below with reference to FIGS. 9 to 12. The technical features described in the method embodiment are applicable to the following device embodiments.

Figure 9:
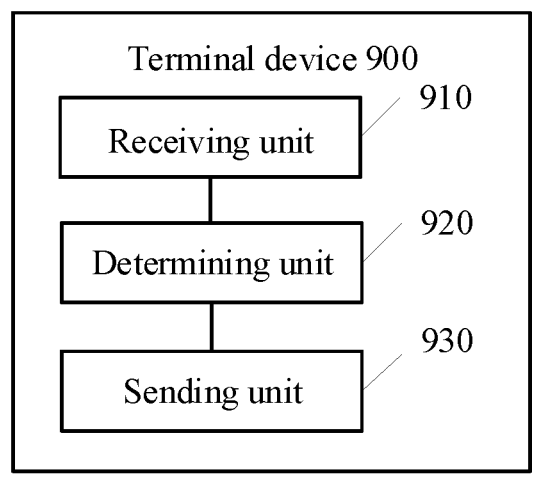
FIG. 9 is a schematic block diagram of a terminal device according to an embodiment of the present application.

FIG. 9 is a schematic block diagram of a terminal device 900 according to an embodiment of the present application. As shown in FIG. 9, the terminal device 900 includes a receiving unit 910, a determining unit 920, and a sending unit 930.

The receiving unit 910 is configured to receive downlink control information for scheduling target data sent by a network device.

The receiving unit 910 is further configured to receive the target data sent by the network device.

The determining unit 920 is configured to determine a feedback parameter of a hybrid automatic repeat request-acknowledgement (HARQ-ACK) codebook according to the downlink control information received by the receiving unit 910, wherein the HARQ-ACK codebook includes HARQ-ACK information of the target data, the feedback parameter include a feedback mode of the HARQ-ACK codebook and/or a feedback resource for sending the HARQ-ACK codebook, and the feedback mode of the HARQ-ACK codebook includes a semi-static feedback mode or a dynamic feedback mode.

The sending unit 930 is configured to send the HARQ-ACK codebook to the network device according to the feedback parameter determined by the determining unit 920.

Therefore, the network device can flexibly indicate to the terminal device, through the downlink control information, the feedback parameter to be used for feeding back the HARQ-ACK codebook, and after receiving the downlink control information, the terminal device can acquire the feedback parameter to be used for sending the HARQ-ACK codebook according to the downlink control information, thereby meeting feedback requirements of different downlink data without causing resource waste.

Optionally, the feedback parameter includes the feedback mode of the HARQ-ACK codebook, and the determining unit 920 is specifically configured to determine that the feedback mode of the HARQ-ACK codebook is the semi-static feedback mode if a radio network temporary identity (RNTI) for descrambling the downlink control information is a first RNTI; and/or determine that the feedback mode of the HARQ-ACK codebook is the dynamic feedback mode if the RNTI for descrambling the downlink control information is a second RNTI.

Optionally, the receiving unit 910 is further configured to receive first configuration information sent by the network device, the first configuration information indicating a corresponding relationship between the RNTI for descrambling the downlink control information and the feedback mode of the HARQ-ACK codebook; or the terminal device further includes an obtaining unit configured to obtain the corresponding relationship pre-stored in the terminal device.

Optionally, if the determining unit 920 determines that the feedback mode of the HARQ-ACK codebook is the semi-static feedback mode, the determining unit 920 is further configured to determine a position of the HARQ-ACK information of the target data in the HARQ-ACK codebook according to a position of the target data in a downlink transmission window corresponding to the HARQ-ACK codebook.

Optionally, if the determining unit 920 determines that the feedback mode of the HARQ-ACK codebook is the dynamic feedback mode, the determining unit 920 is further configured to determine the position of the HARQ-ACK information of the target data in the HARQ-ACK codebook according to a DAI of the target data carried in the downlink control information.

Optionally, the feedback parameter includes a feedback resource of the HARQ-ACK codebook, and the determining unit 920 is specifically configured to determine an uplink control channel for sending the HARQ-ACK codebook according to second configuration information carried in the last downlink control information among downlink control information descrambled with the same RNTI as the downlink control information, the second configuration information being for indicating the uplink control channel; and the sending unit 930 is specifically configured to send the HARQ-ACK codebook to the network device on the uplink control channel.

Optionally, the HARQ-ACK information of downlink data scheduled by downlink control information descrambled with different RNTIs is located in different HARQ-ACK codebooks.

It should be understood that the terminal device 900 can perform the corresponding operations performed by the terminal device in the above method 400, which will not be repeated herein for brevity.

Figure 10:
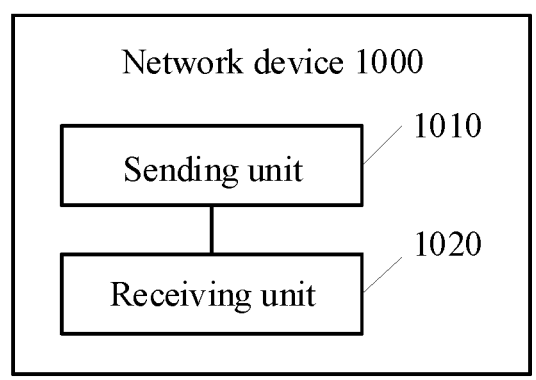
FIG. 10 is a schematic block diagram of a network device according to an embodiment of the present application.

FIG. 10 is a schematic block diagram of a network device 1000 according to an embodiment of the present application. As shown in FIG. 10, the network device 1000 includes a sending unit 1010 and a receiving unit 1020.

The sending unit 1010 is configured to send downlink control information for scheduling target data to a terminal device, the downlink control information being used for the terminal device to determine a feedback parameter of a hybrid automatic repeat request-acknowledgement (HARQ-ACK) codebook, wherein the HARQ-ACK codebook includes HARQ-ACK information of the target data, the feedback parameter includes a feedback mode of the HARQ-ACK codebook and/or a feedback resource for sending the HARQ-ACK codebook, and the feedback mode of the HARQ-ACK code includes a semi-static feedback mode or a dynamic feedback mode.

The sending unit 1010 is further configured to send the target data to the terminal device.

The receiving unit 1020 is configured to receive the HARQ-ACK codebook sent by the terminal device according to the feedback parameter.

Therefore, the network device can flexibly indicate to the terminal device, through the downlink control information, the feedback parameter to be used for feeding back the HARQ-ACK codebook, and after receiving the downlink control information, the terminal device can acquire the feedback parameter to be used for sending the HARQ-ACK codebook according to the downlink control information, thereby meeting feedback requirements of different downlink data without causing resource waste.

Optionally, the feedback parameter includes the feedback mode of the HARQ-ACK codebook, and the network device further includes a determining unit, which is configured to determine that a radio network temporary identity (RNTI) for scrambling the downlink control information is a first RNTI if the feedback mode of the HARQ-ACK codebook is the semi-static feedback mode; and/or determine that the RNTI for scrambling the downlink control information is a second RNTI if the feedback mode of the HARQ-ACK codebook is the dynamic feedback mode.

Optionally, the sending unit 1010 is further configured to send first configuration information to the terminal device, the first configuration information indicating a corresponding relationship between the RNTI for scrambling the downlink control information and the feedback mode of the HARQ-ACK codebook.

Optionally, the determining unit is further configured to determine that the feedback mode of the HARQ-ACK codebook is the semi-static feedback mode if the amount of downlink data corresponding to the HARQ-ACK codebook is greater than or equal to a preset threshold; and/or determine that the feedback mode of the HARQ-ACK codebook is the dynamic feedback mode if the amount of the downlink data corresponding to the HARQ-ACK codebook is less than the preset threshold.

Optionally, the receiving unit 1020 is specifically configured to receive the HARQ-ACK codebook sent by the terminal device according to the semi-static feedback mode, the HARQ-ACK codebook including HARQ-ACK information of the downlink data scheduled by the downlink control information scrambled with the first RNTI; and/or receive the HARQ-ACK codebook sent by the terminal device according to the dynamic feedback mode, the HARQ-ACK codebook including HARQ-ACK information of the downlink data scheduled by the downlink control information scrambled with the second RNTI.

Optionally, the feedback parameter includes a feedback resource of the HARQ-ACK codebook, and the determining unit is specifically configured to determine, according to a service type of the target data, an uplink control channel for the terminal device to send the HARQ-ACK codebook. The sending unit 1010 is further configured to second configuration information to the terminal device, the second configuration information being used for indicating the uplink control channel, and the second configuration information being carried in the last downlink control information among downlink control information scrambled with the same RNTI as the downlink control information, wherein RNTIs used by the network device when scrambling downlink control information for scheduling downlink data of different service types are different.

Optionally, the determining unit is specifically configured to determine that the uplink control channel is a first uplink control channel if the service type of the target data is URLLC; and/or determine that the uplink control channel is a second uplink control channel if the service type of the target data is eMBB.

Optionally, the first uplink control channel is located before the second uplink control channel in time domain, and/or a coding bit rate of the first uplink control channel is lower than that of the second uplink control channel.

Optionally, the receiving unit 1020 is specifically configured to receive the HARQ-ACK codebook sent by the terminal device on the uplink control channel, wherein HARQ-ACK codebooks received by the network device on different uplink control channels include HARQ-ACK information of downlink data scheduled by downlink control information scrambled with different RNTIs.

Optionally, the HARQ-ACK information of downlink data scheduled by downlink control information descrambled with different RNTIs is located in different HARQ-ACK codebooks.

Figure 11:
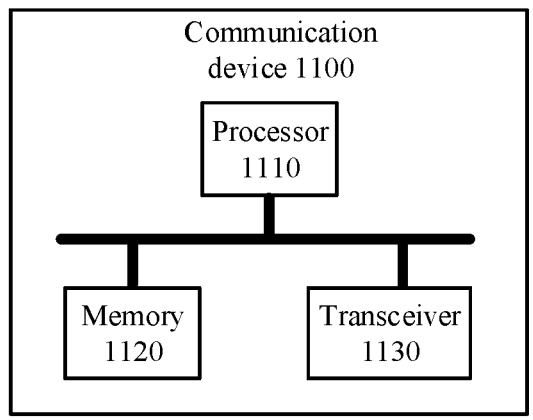
FIG. 11 is a schematic structural diagram of a communication device according to an embodiment of the present application.

It should be understood that the network device 1000 can perform the corresponding operations performed by the network device in the above method 400, which will not be repeated herein for brevity FIG. 11 is a schematic structural diagram of a communication device 1100 according to an embodiment of the present application. The communication device 1100 shown in FIG. 11 includes a processor 1110. The processor 1110 may call and run a computer program from a memory to implement the method in the embodiment of the present application.

Optionally, as shown in FIG. 11, the communication device 1100 may further include a memory 1120. The processor 1110 may call and run a computer program from the memory 1120 to implement the method in the embodiment of the present application.

The memory 1120 may be a separate device independent of the processor 1110 or may be integrated in the processor 1110.

Optionally, as shown in FIG. 11, the communication device 1100 may further include a transceiver 1130, and the processor 1110 may control the transceiver 1130 to communicate with other devices. Specifically, the transceiver 1130 may send information or data to other devices or receive information or data sent by other devices.

The transceiver 1130 may include a transmitter and a receiver. The transceiver 1130 may further include antennas, the number of which may be one or more.

Optionally, the communication device 1100 may be specifically the terminal device in the embodiment of the present application, and the communication device 1100 may implement the corresponding processes implemented by the terminal device in the various methods in the embodiments of the present application, which will not be repeated herein for brevity.

Optionally, the communication device 1100 may be specifically the network device in the embodiment of the present application, and the communication device 1100 may implement the corresponding processes implemented by the network device in various methods in the embodiment of the present application, which will not be repeated herein for brevity.

Figure 12:
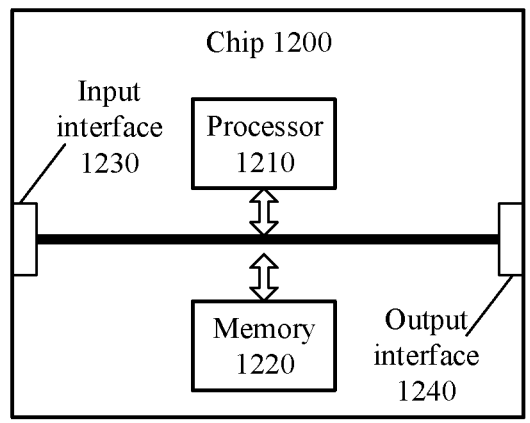
FIG. 12 is a schematic structural diagram of a chip according to an embodiment of the present application.

FIG. 12 is a schematic structural diagram of a chip according to an embodiment of the present application. The chip 1200 shown in FIG. 12 includes a processor 1210. The processor 1210 may call and run a computer program from a memory to implement the method in the embodiment of the present application.

Optionally, as shown in FIG. 12, the chip 1200 may further include a memory 1220. The processor 1210 may call and run a computer program from the memory 1220 to implement the method in the embodiment of the present application.

The memory 1220 may be a separate device independent of the processor 1210 or may be integrated in the processor 1210.

Optionally, the chip 1200 may further include an input interface 1230. The processor 1210 may control the input interface 1230 to communicate with other devices or chips, and specifically, may acquire information or data sent by other devices or chips.

Optionally, the chip 1200 may further include an output interface 1240. The processor 1210 may control the output interface 1240 to communicate with other devices or chips, and specifically, may output information or data to other devices or chips.

Optionally, the chip may be applied to the terminal device in the embodiment of the present application, and the chip may implement the corresponding processes implemented by the terminal device in the various methods in the embodiments of the present application, which will not be repeated herein for brevity.

Optionally, the chip may be applied to the network device in the embodiment of the present application, and the chip may implement the corresponding processes implemented by the network device in various methods in the embodiments of the present application, which will not be repeated herein for brevity.

It should be understood that the chip mentioned in the embodiment of the present application may be referred to as a system-level chip, a system chip, a chip system or a system-on-chip, etc.

It should be understood that the processor in the embodiment of the present application may be an integrated circuit chip having a signal processing capability. In an implementation process, the steps of the method embodiment described above may be accomplished through an integrated logic circuit of hardware in the processor or instructions in a form of software. The processor mentioned above may be a general purpose processor, a digital signal processor (DSP), an application specific integrated circuit (ASIC), a field programmable gate array (FPGA) or another programmable logic device, a discrete gate or a transistor logic device, or a discrete hardware component, which may implement or perform various methods, steps and logical block diagrams disclosed in the embodiments of the present application. The general purpose processor may be a microprocessor, or the processor may be any conventional processor, or the like. The steps of the method disclosed in the embodiment of the present application may be directly embodied as execution by a hardware decoding processor, or execution by a combination of hardware and software modules in the decoding processor. The software modules may be located in a storage medium which is mature in the art, such as a random access memory, a flash memory, a read-only memory, a programmable read-only memory, an electrically erasable programmable memory, or a register. The storage medium is located in the memory, and the processor reads information in the memory and completes the steps of the above method in combination with its hardware.

It may be understood that the memory in the embodiments of the present application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache.

By exemplary but not restrictive description, many forms of RAMs may be used, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory in the systems and methods described herein is intended to include, but not be limited to, these and any other suitable types of memories.

Figure 13:
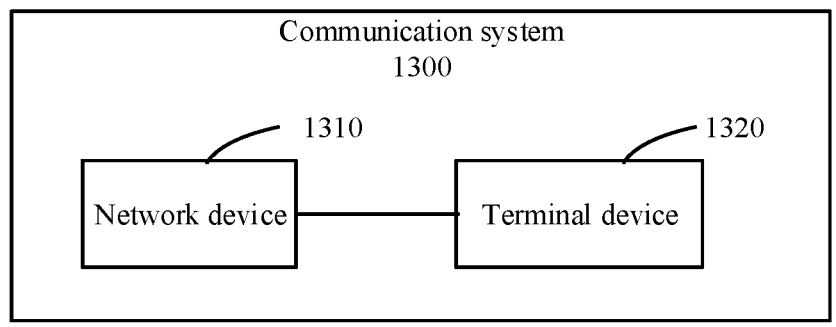
FIG. 13 is a schematic block diagram of a communication system according to an embodiment of the present application.

FIG. 13 is a schematic block diagram of a communication system 1300 according to an embodiment of the present application. As shown in FIG. 13, the communication system 1300 may include a network device 1310 and a terminal device 1320.

The network device 1310 is configured to send downlink control information for scheduling target data to a terminal device, the downlink control information being used for the terminal device to determine a feedback parameter of a hybrid automatic repeat request-acknowledgement (HARQ-ACK) codebook, wherein the HARQ-ACK codebook includes HARQ-ACK information of the target data, the feedback parameter includes a feedback mode of the HARQ-ACK codebook and/or a feedback resource for sending the HARQ-ACK codebook, and the feedback mode of the HARQ-ACK codebook includes a semi-static feedback mode or a dynamic feedback mode; send the target data to the terminal device; and receive the HARQ-ACK codebook sent by the terminal device according to the feedback parameter.

The terminal device 1320 is configured to receive downlink control information for scheduling target data sent by a network device; receive the target data sent by the network device; determine the feedback parameter of the hybrid automatic repeat request-acknowledgement (HARQ-ACK) codebook according to the downlink control information, wherein the HARQ-ACK codebook includes the HARQ-ACK information of the target data, the feedback parameter includes the feedback mode of the HARQ-ACK codebook and/or the feedback resource for sending the HARQ-ACK codebook, and the feedback mode of the HARQ-ACK codebook includes the semi-static feedback mode or the dynamic feedback mode; and send the HARQ-ACK codebook to the network device according to the feedback parameter.

The network device 1310 can be used to implement the corresponding functions implemented by the network device in the above method 400, and the composition of the network device 1310 can be as shown in FIG. 10 which shows a network device 1000, which will not be repeated herein for brevity.

The terminal device 1320 can be used to implement the corresponding functions implemented by the terminal device in the above method 400, and the composition of the terminal device 1320 can be as shown in FIG. 9 which shows a terminal device 900, which will not be repeated herein for brevity.

An embodiment of the present application further provides a computer-readable storage medium configured to store a computer program. Optionally, the computer-readable storage medium may be applied to the network device in the embodiment of the present application, and the computer program causes a computer to perform the corresponding processes implemented by the network device in various methods in the embodiments of the present application, which will not be repeated herein for brevity. Optionally, the computer-readable storage medium may be applied to the terminal device in the embodiment of the present application, and the computer program causes a computer to perform the corresponding processes implemented by the terminal device in various methods in the embodiments of the present application, which will not be repeated herein for brevity.

An embodiment of the present application also provides a computer program product including computer program instructions. Optionally, the computer program product may be applied to the network device in the embodiment of the present application, and the computer program instructions cause a computer to perform the corresponding processes implemented by the network device in various methods in the embodiments of the present application, which will not be repeated herein for brevity. Optionally, the computer program product may be applied to the terminal device in the embodiment of the present application, and the computer program instructions cause a computer to perform the corresponding processes implemented by the terminal device in various methods in the embodiments of the present application, which will not be repeated herein for brevity.

An embodiment of the present application also provides a computer program. Optionally, the computer program may be applied to the network device in the embodiment of the present application. The computer program, when running on a computer, causes the computer to perform the corresponding processes implemented by the network device in various methods in the embodiments of the present application, which will not be repeated herein for brevity. Optionally, the computer program may be applied to the terminal device in the embodiment of the present application. The computer program, when running on a computer, causes the computer to perform the corresponding processes implemented by the terminal device in various methods in the embodiments of the present application, which will not be repeated herein for brevity.

It should be understood that the terms "system" and "network" are often used interchangeably herein. The term "and/or" herein describes an association relationship between associated objects only, indicating that there may be three relationships, for example, A and/or B may indicate three cases: A alone, A and B, and B alone. In addition, the symbol "I" herein generally indicates that there is a "or" relationship between the associated objects before and after "/".

It should be understood that in embodiments of the present invention, "B corresponding to A" means that B is associated with A, and B may be determined according to A. However, it should be further understood that determining B according to A does not mean B is determined according to A only, but B may be determined according to A and/or other information.

A person of ordinary skill in the art may recognize that the elements and algorithm steps in various examples described in combination with the embodiments disclosed herein can be implemented in electronic hardware, or a combination of computer software and electronic hardware. Whether these functions are implemented in hardware or software depends on the specific application and design constraints of the technical solution. Skilled artisans may use different methods to implement the described functions for each particular application, but such implementation should not be considered to be beyond the scope of the present application.

Those skilled in the art may clearly understand that for the sake of convenience and conciseness of description, the specific working processes of the systems, devices and units described above may be described with reference to the corresponding processes in the above method embodiments and will not be repeated herein.

In several embodiments provided by the present application, it should be understood that the disclosed systems, devices and methods may be implemented in other ways. For example, the device embodiments described above are only illustrative, for example, the division of the units is only a logical function division, and there may be other division manners in actual implementation. For example, multiple units or components may be combined or integrated into another system, or some features may be ignored or not executed. In addition, the shown or discussed coupling or direct coupling or communication connection between each other may be an indirect coupling or communication connection through some interfaces, devices or units, or may be in electrical, mechanical or other forms.

The unit described as a separate component may or may not be physically separated, and the component shown as a unit may or may not be a physical unit, i.e., it may be located in one place or may be distributed over multiple network units. Part or all of the units may be selected according to actual needs to achieve the purpose of the embodiments.

In addition, various functional units in various embodiments of the present application may be integrated into one processing unit, or may exist physically separately, or two or more than two units may be integrated into one unit.

The functions, if implemented in a form of software functional units and sold or used as an independent product, may be stored in a computer-readable storage medium. Based on such understanding, the technical solution of the present application, in essence, or the part contributing to the prior art, or the part of the technical solution, may be embodied in the form of a software product, which is stored in a storage medium, and includes several instructions for causing a computer device (which may be a personal computer, a server, or a network device, etc.) to perform all or part of the steps of various embodiments of the present application. The aforementioned storage medium includes various media, such as a U disk, a mobile hard disk, a read-only memory (ROM), a random access memory (RAM), a magnetic disk, or an optical disk, which are capable of storing program codes What are described above are merely example implementations of the present application, but the protection scope of the present application is not limited thereto. Any variation or substitution that may easily conceived by a person skilled in the art within the technical scope disclosed by the present application shall be included within the protection scope of the present application. Therefore, the protection scope of the present application shall be subject to the protection scope of the claims.

What is claimed is:

1. A method for transmitting feedback information, comprising:
    receiving, by a terminal device, downlink control information for scheduling target data sent by a network device;
    receiving, by the terminal device, the target data sent by the network device;
    determining, by the terminal device, a feedback parameter of a hybrid automatic repeat request-acknowledgement (HARQ-ACK) codebook according to the downlink control information, the feedback parameter comprising a feedback mode of the HARQ-ACK codebook, or the feedback parameter comprising a feedback mode of the HARQ-ACK codebook and a feedback resource for sending the HARQ-ACK codebook, wherein the HARQ-ACK codebook comprises HARQ-ACK information of the target data, and the feedback mode of the HARQ-ACK codebook comprises a semi-static feedback mode or a dynamic feedback mode; in the semi-static feedback mode, a size of the HARQ-ACK codebook and a corresponding relationship between each indication field in the HARQ-ACK codebook and downlink data are determined semi-statically, and in the dynamic feedback mode, the size of the HARQ-ACK codebook and the corresponding relationship between each indication field in the HARQ-ACK codebook and the downlink data are determined dynamically, depending on an indication of a downlink assignment index (DAI); and
    sending, by the terminal device, the HARQ-ACK codebook to the network device according to the feedback parameter;
    wherein the feedback parameter comprises the feedback mode of the HARQ-ACK codebook and the feedback resource for sending the HARQ-ACK codebook, and determining, by the terminal device, the feedback parameter of the HARQ-ACK codebook according to the downlink control information comprises:
    determining, by the terminal device, an uplink control channel for sending the HARQ-ACK codebook according to a configuration information carried in a last downlink control information among downlink control information descrambled with the same RNTI as the downlink control information, the configuration information being used for indicating the uplink control channel;
    wherein sending, by the terminal device, the HARQ-ACK codebook to the network device according to the feedback parameter comprises:
    sending, by the terminal device, the HARQ-ACK codebook on the uplink control channel to the network device.

2. The method according to claim 1, wherein the feedback mode of the HARQ-ACK codebook is configured by the network device for the terminal device through the downlink control information; or, the feedback mode of the HARQ-ACK codebook and the feedback resource for sending the HARQ-ACK codebook are configured by the network device for the terminal device through the downlink control information.

3. The method according to claim 1, wherein an uplink control channel for the terminal device to send the HARQ-ACK codebook is determined according to a service type of the target data configured by the network device.

4. The method according to claim 3, further comprising:
    receiving, by the terminal device, a configuration information sent by the network device, the configuration information being used for indicating the uplink control channel for sending the HARQ-ACK codebook.

5. The method according to claim 3, wherein different uplink control channels are used for target data of different service types.

6. A method for transmitting feedback information, comprising:
  sending, by a network device, downlink control information for scheduling target data to a terminal device, the downlink control information being used for the terminal device to determine a feedback parameter of a hybrid automatic repeat request-acknowledgement (HARQ-ACK) codebook, the feedback parameter comprising a feedback mode of the HARQ-ACK codebook, or the feedback parameter comprising a feedback mode of the HARQ-ACK codebook and a feedback resource for sending the HARQ-ACK codebook, wherein the HARQ-ACK codebook comprises HARQ-ACK information of the target data, and the feedback mode of the HARQ-ACK codebook comprises a semi-static feedback mode or a dynamic feedback mode; in the semi-static feedback mode, a size of the HAR-Q-ACK codebook and a corresponding relationship between each indication field in the HARQ-ACK codebook and downlink data are determined semi-statically, and in the dynamic feedback mode, the size of the HARQ-ACK codebook and the corresponding relationship between each indication field in the HARQ-ACK codebook and the downlink data are determined dynamically, depending on an indication of a downlink assignment index (DAI);
  sending, by the network device, the target data to the terminal device; and
  receiving, by the network device, the HARQ-ACK codebook sent by the terminal device according to the feedback parameter; wherein the method further comprises:
  determining, by the network device, an uplink control channel for the terminal device to send the HARQ-ACK codebook according to a service type of the target data; and
  sending, by the network device, a configuration information to the terminal device, the configuration information being used for indicating the uplink control channel for sending the HARQ-ACK codebook; wherein the configuration information is carried in the last downlink control information among downlink control information scrambled with the same RNTI as the downlink control information.

7. The method according to claim 6, further comprising:
  configuring, by the network device for the terminal device, the feedback mode of the HARQ-ACK codebook; or
  configuring, by the network device for the terminal device, the feedback mode of the HARQ-ACK codebook and the feedback resource for sending the HARQ-ACK codebook.

8. The method according to claim 7, wherein configuring, by the network device for the terminal device, the feedback mode of the HARQ-ACK codebook comprises:
  indicating, by the network device to the terminal device through the downlink control information, the feedback mode of the HARQ-ACK codebook; or
  wherein configuring, by the network device for the terminal device, the feedback mode of the HARQ-ACK codebook and the feedback resource for sending the HARQ-ACK codebook comprises:
  indicating, by the network device to the terminal device through the downlink control information, the feedback mode of the HARQ-ACK codebook and the feedback resource for sending the HARQ-ACK codebook.

9. The method according to claim 6, wherein different uplink control channels are used for target data of different service types.

10. A terminal device, comprising a processor and a transceiver, wherein
  the transceiver is configured to receive downlink control information for scheduling target data sent by a network device;
  the transceiver is further configured to receive the target data sent by the network device;
  the processor is configured to determine a feedback parameter of a hybrid automatic repeat request-acknowledgement (HARQ-ACK) codebook according to the downlink control information, the feedback parameter comprising a feedback mode of the HARQ-ACK codebook, or the feedback parameter comprising a feedback mode of the HARQ-ACK codebook and a feedback resource for sending the HARQ-ACK codebook, wherein the HARQ-ACK codebook comprises HARQ-ACK information of the target data, and the feedback mode of the HARQ-ACK codebook comprises a semi-static feedback mode or a dynamic feedback mode; in the semi-static feedback mode, a size of the HARQ-ACK codebook and a corresponding relationship between each indication field in the HARQ-ACK codebook and downlink data are determined semi-statically, and in the dynamic feedback mode, the size of the HARQ-ACK codebook and the corresponding relationship between each indication field in the HARQ-ACK codebook and the downlink data are determined dynamically, depending on an indication of a downlink assignment index (DAI); and
  the transceiver is further configured to send the HARQ-ACK codebook to the network device according to the feedback parameter; wherein the feedback parameter comprises the feedback mode of the HARQ-ACK codebook and the feedback resource for sending the HARQ-ACK codebook, and the processor is further configured to:
  determine an uplink control channel for sending the HARQ-ACK codebook according to a configuration information carried in a last downlink control information among downlink control information descrambled with the same RNTI as the downlink control information, the configuration information being used for indicating the uplink control channel;
  wherein the transceiver is further configured to:
  send the HARQ-ACK codebook on the uplink control channel to the network device.

11. The terminal device according to claim 10, wherein the feedback mode of the HARQ-ACK codebook is configured by the network device for the terminal device through the downlink control information; or, the feedback mode of the HARQ-ACK codebook and the feedback resource for sending the HARQ-ACK codebook are configured by the network device for the terminal device through the downlink control information.

12. The terminal device according to claim 10, wherein an uplink control channel for the terminal device to send the HARQ-ACK codebook is determined according to a service type of the target data configured by the network device.

13. The terminal device according to claim 12, wherein the transceiver is further configured to receive a configuration information sent by the network device, the configuration information being used for indicating the uplink control channel for sending the HARQ-ACK codebook.

14. The terminal device according to claim 12, wherein different uplink control channels are used for target data of different service types.

15. A network device, comprising a transceiver, wherein the transceiver is configured to send downlink control information for scheduling target data to a terminal device, the downlink control information being used for the terminal device to determine a feedback parameter of a hybrid automatic repeat request-acknowledgement (HARQ-ACK) codebook, the feedback parameter comprising a feedback mode of the HARQ-ACK codebook, or the feedback parameter comprising a feedback mode of the HARQ-ACK codebook and a feedback resource for sending the HARQ-ACK codebook, wherein the HARQ-ACK codebook comprises HARQ-ACK information of the target data, and the feedback mode of the HARQ-ACK codebook comprises a semi-static feedback mode or a dynamic feedback mode; in the semi-static feedback mode, a size of the HARQ-ACK codebook and a corresponding relationship between each indication field in the HARQ-ACK codebook and downlink data are determined semi-statically, and in the dynamic feedback mode, the size of the HARQ-ACK codebook and the corresponding relationship between each indication field in the HARQ-ACK codebook and the downlink data are determined dynamically, depending on an indication of a downlink assignment index (DAI);

the transceiver is further configured to send the target data to the terminal device; and the transceiver is further configured to receive the HARQ-ACK codebook sent by the terminal device according to the feedback parameter;

wherein the network device further comprises a processor, wherein the processor is configured to determine determining, by the network device, an uplink control channel for the terminal device to send the HARQ-ACK codebook according to a service type of the target data; and the transceiver is further configured to send a configuration information to the terminal device, the configuration information being used for indicating the uplink control channel for sending the HARQ-ACK codebook; wherein the configuration information is carried in the last downlink control information among downlink control information scrambled with the same RNTI as the downlink control information.

16. The network device according to claim 15, wherein the processor is configured to configure, for the terminal device, the feedback mode of the HARQ-ACK codebook; or the processor is configured to configure, for the terminal device, the feedback mode of the HARQ-ACK codebook and the feedback resource for sending the HARQ-ACK codebook.

17. The network device according to claim 16, wherein the processor is configured to indicate, to the terminal device through the downlink control information, the feedback mode of the HARQ-ACK codebook; or, the processor is configured to indicate, to the terminal device through the downlink control information, the feedback mode of the HARQ-ACK codebook and the feedback resource for sending the HARQ-ACK codebook.

18. The network device according to claim 15, wherein the processor is configured to determine, according to a service type of the target data, an uplink control channel for the terminal device to send the HARQ-ACK codebook.

19. The network device according to claim 18, wherein different uplink control channels are used for target data of different service types.

* * * * *